United States Patent
Ramaiyer

(10) Patent No.: US 8,024,288 B2
(45) Date of Patent: Sep. 20, 2011

(54) BLOCK COMPRESSION USING A VALUE-BIT FORMAT FOR STORING BLOCK-CELL VALUES

(75) Inventor: Kumar Ramaiyer, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 642 days.

(21) Appl. No.: 12/199,759

(22) Filed: Aug. 27, 2008

(65) Prior Publication Data

US 2010/0057676 A1 Mar. 4, 2010

(51) Int. Cl.
*G06F 17/30* (2006.01)

(52) U.S. Cl. ........ 707/603; 707/600; 707/607; 707/741; 707/802; 707/803

(58) Field of Classification Search .................. 707/600, 707/603, 607, 741, 802, 803
See application file for complete search history.

(56) References Cited

U.S. PATENT DOCUMENTS

| | | | |
|---|---|---|---|
| 5,359,724 A | 10/1994 | Earle | |
| 5,890,151 A * | 3/1999 | Agrawal et al. ...................... | 1/1 |
| 6,167,856 B1 * | 1/2001 | Rao et al. ................... | 123/90.51 |
| 6,233,647 B1 * | 5/2001 | Bentz et al. ....................... | 711/3 |
| 6,859,455 B1 * | 2/2005 | Yazdani et al. ............... | 370/392 |
| 6,941,315 B2 * | 9/2005 | Goldstein et al. ............. | 707/741 |
| 7,283,987 B2 * | 10/2007 | Cha et al. .............................. | 1/1 |
| 7,325,001 B2 * | 1/2008 | Goldstein et al. ..................... | 1/1 |
| 7,430,567 B2 * | 9/2008 | Goldstein et al. ..................... | 1/1 |
| 7,961,965 B2 * | 6/2011 | Moreira ......................... | 382/240 |
| 2004/0260727 A1 * | 12/2004 | Goldstein et al. .......... | 707/104.1 |
| 2005/0171972 A1 * | 8/2005 | Goldstein et al. .......... | 707/103 R |
| 2006/0041541 A1 * | 2/2006 | Goldstein et al. ................. | 707/3 |
| 2009/0279805 A1 * | 11/2009 | Qian et al. .................... | 382/253 |
| 2009/0285311 A1 * | 11/2009 | Moreira .................... | 375/240.26 |

* cited by examiner

*Primary Examiner* — Frantz Coby
(74) *Attorney, Agent, or Firm* — Trellis IP Law Group, PC

(57) ABSTRACT

Particular embodiments store multidimensional block data using a value-bit format. A block of data is determined that includes a first dimension and a second dimension. The occurrences of unique values in the block of data is then determined. If the number of unique values does not violate a threshold, a value-bit format may be used instead of storing the data in a fully-exploded array. In this case, the value for the unique values is stored with an indication of where the unique values occur in the block of data. When a request for a value at an index position in the array is received, the value-bit format is used to retrieve the value requested. A bit that indicates the value that is associated with the index position in the array is determined and that value is returned.

20 Claims, 9 Drawing Sheets

| Measure | Time0 | Time1 | Time2 | Time3 | Time4 |
|---|---|---|---|---|---|
| M0 | null | null | 2 | null | 3 |
| M1 | null | 2 | 2 | 2 | 3 |
| M2 | null | 3 | 2 | null | null |
*Fig. 2A*
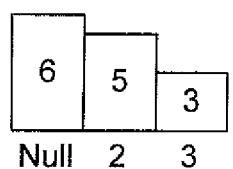
*Fig. 2B*
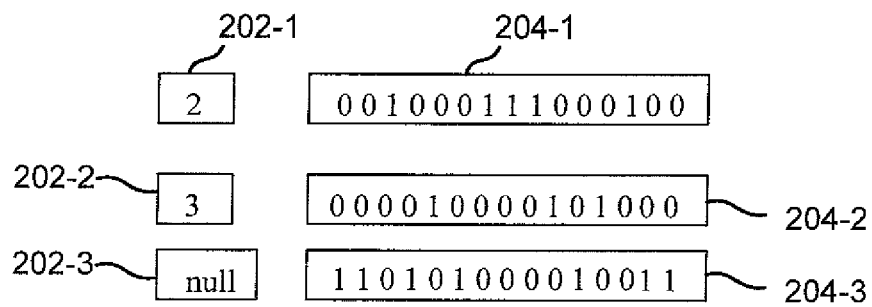
*Fig. 2C*
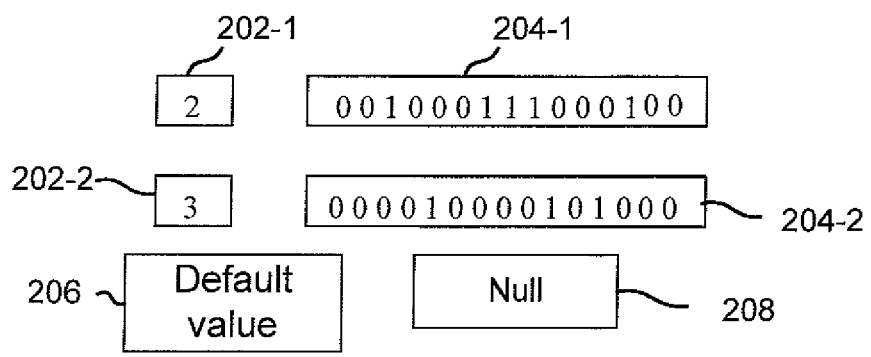
*Fig. 2D*

BLOCK COMPRESSION USING A VALUE-BIT FORMAT FOR STORING BLOCK-CELL VALUES

BACKGROUND

Particular embodiments generally relate to database systems.

Online analytical processing (OLAP) applications are used to provide answers to analytical queries that are multidimensional in nature. Complex analytical and ad hoc queries may be provided by users. Because multidimensional data may organize data in more than two dimensions, a multidimensional data model is used to store the data in a database. A cube has been developed as a model to store multidimensional objects where the cube is stored as multiple blocks of data. The blocks are stored in fully-exploded arrays for different two-dimensional combinations of the multidimensional data. With a large number of dimensions, not all combinations may include data. For example, if a first dimension is a certain product and a second dimension is geographical areas. The sales of a product in different geographical areas over a time period may be requested, but the company may not sell products in all geographical areas. Blocks for these geographical areas will not contain data and are considered sparse. However, for the areas in which a company has a large amount of sales, the blocks include a lot of data and are considered dense. Because the database reserves a fully-exploded array for each combination that is possible, this results in a lot of unused database memory.

SUMMARY

Particular embodiments store multidimensional block data using a value-bit format. A block of data is determined that includes a first dimension and a second dimension. The block of data may be a combination of two dense dimensions from a cube of data. The occurrences of unique values in the block of data is then determined. If the number of unique values does not violate a threshold, a value-bit format may be used instead of storing the data in a fully-exploded array. In this case, the value for the unique values is stored with an indication of where the unique values occur in the block of data. For example, a zero or one may be used to indicate whether or not the unique value occurs at each position of the array. By storing the block of data in a value-bit format, the number of bits used to realize the block of data may be reduced. This is because every instance of a unique value does not need to be stored in the array. A value-bit format, where a particular value's occurrence in an array is indicated by a bit set in a bit pattern, may use less than the storage requirements for storing all of the unique values in the array. When a request for a value at an index position in the array is received, the value-bit format is used to retrieve the value requested. A bit that indicates the value that is associated with the index position in the array is determined and that value is returned.

A further understanding of the nature and the advantages of particular embodiments disclosed herein may be realized by reference of the remaining portions of the specification and the attached drawings.

BRIEF DESCRIPTION OF THE DRAWINGS

FIG. 2A shows another example of a block of data.

FIG. 2B shows a histogram analysis of the number of the unique values.

FIG. 2C shows the block of data stored in the value-bit format.

FIG. 2D shows an optimization of the value-bit format of FIG. 2C.

DETAILED DESCRIPTION OF EMBODIMENTS

Particular embodiments store multidimensional data in a value-bit format instead of in an array. The value-bit format stores a value with an indication whether or not the value is found at different positions in the array. The array, in contrast, would have stored the values in the array (i.e., if a value occurs at multiple positions in the array, the same value is stored multiple times at the different indices). Requests may be received for index positions for the array, the value-bit format is then used to determine values that correspond to the requested index positions.

The value-bit format may be used when storing cubes of data in a database system. One method for conventionally storing the cubes of data is described in FIG. 8. The cubes include multiple dimensions (e.g., three or more) for data. The dimensions of the cube may be characterized as dense or sparse. A dense dimension may be a dimension that may include a large amount of data. A sparse dimension may be a dimension that includes very little data. The data for the cube is arranged into blocks, which are multidimensional arrays.

In one embodiment, blocks are created for dense dimensions (i.e., a combination of two dimensions that are expected to include data). However, the sparse combinations of dimensions do not have blocks created for them. Accordingly, the sparseness is exploited by not creating blocks for all possible combinations of dimensions. For example, if a cube has four dimensions, such as region, customer, time, and product, and product and time are dense dimensions and region and customer are sparse dimensions, the sparse dimensions are used as indices into blocks of dense dimensions. For example, if there are 1000 combinations of region and customer that contain data, 1000 blocks may be realized where each block is large enough to store every possible combination of product and time. The sparse combinations of dimensions are used to index into the dense dimensions of product and time. Blocks are not allocated for the sparse dimensions, however. For example, a combination of region and customer for a time period is not created because it is not expected that the block will contain data. Because every single combination for the four dimensions is not realized as blocks of data, memory is saved.

Figure 8:
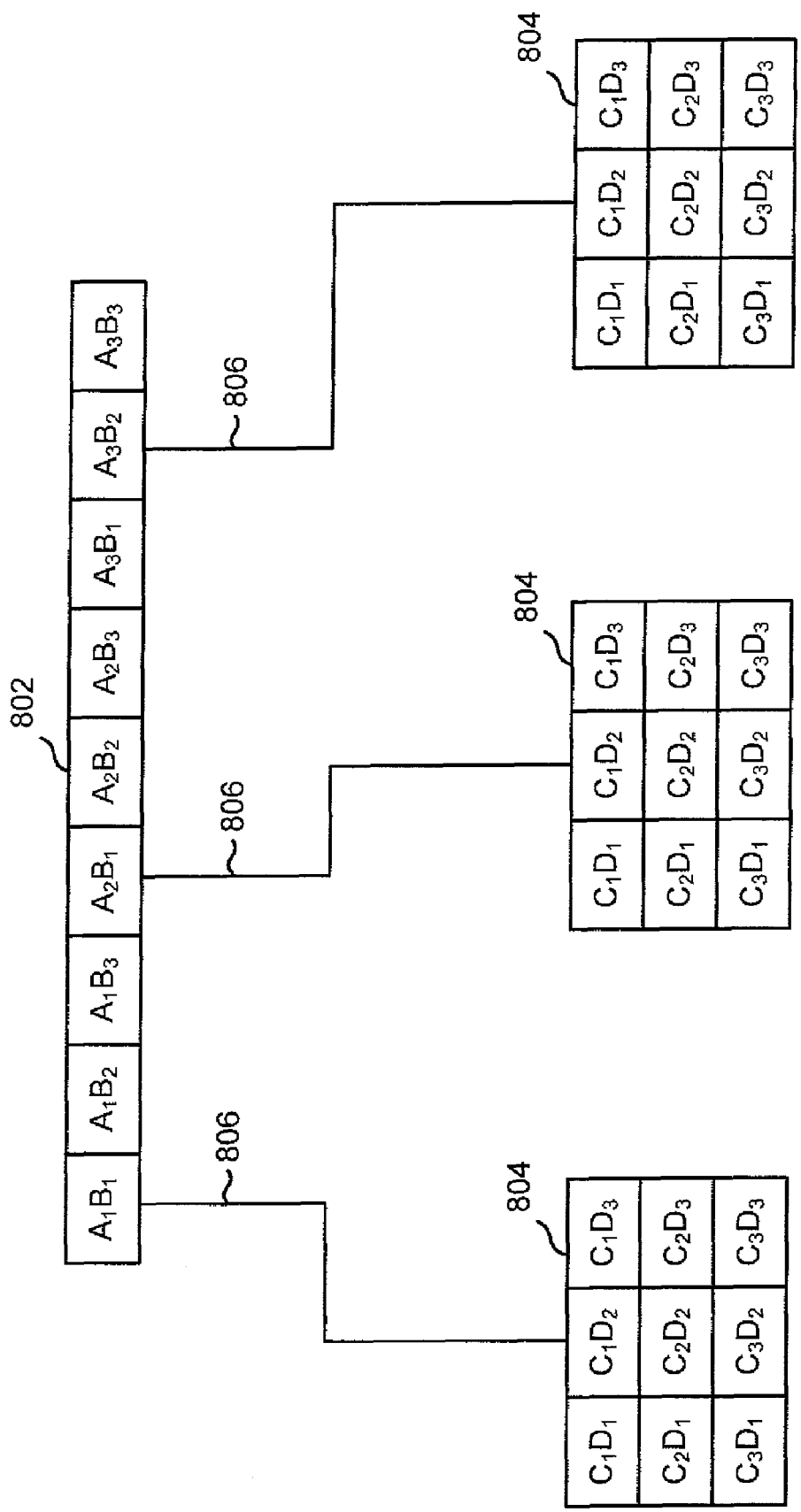
FIG. 8 shows a conventional method of storing the cubes of data.

As shown in FIG. 8, the above four dimensions may be represented by A, B, C, and D, respectively. A and B are sparse dimensions and C and D are the dense dimensions. An index 802 for every combination of the sparse dimensions is shown. If there are 3 possible values for A and B, nine combinations are possible. For each combination, it is possible that a dense combination of C and D exists. Because the dense combination may not exist for all sparse combinations, arrays are not created for each sparse combination.

As shown, data structures for three arrays 804 have been created for three sparse combinations. Arrays are not created for all the sparse dimensions. For the arrays that are created, pointers 806 to arrays 804 are created that reference the sparse dimensions. Each array 804 includes memory space that is reserved for possible combinations of C and D. A formula is used to determine data values for the dense dimensions. The sparse index is used to determine an array and then an offset into the array is used to determine the data value.

While the above provides some compression of data, particular embodiments store the blocks of data in an even more efficient manner. For example, instead of creating a full array for a block of data, a value-bit format is used. In this case, a number of unique values in a block of data is determined. A block of data may not include a large number of unique values. This may not be intuitive because the block may have been considered a dense block (i.e., containing a large amount of data). However, analysis of the block of data may indicate that it includes a large number of duplicate values and nulls. For example, if a block of data includes 25 cells, there may only be 3 unique values that are included in the cells (i.e., the 3 unique values occur multiple times in the cells). Accordingly, particular embodiments store the block of data in a value-bit form. In this case, the value is stored and a bit is set in a bit pattern to indicate where the value is found in the array. This saves space as the bit set uses less storage space than storing all the occurrences of the values in the array. The same formula may be used to return values for requests from the array, but the array is not used to store the values.

Figure 1A:
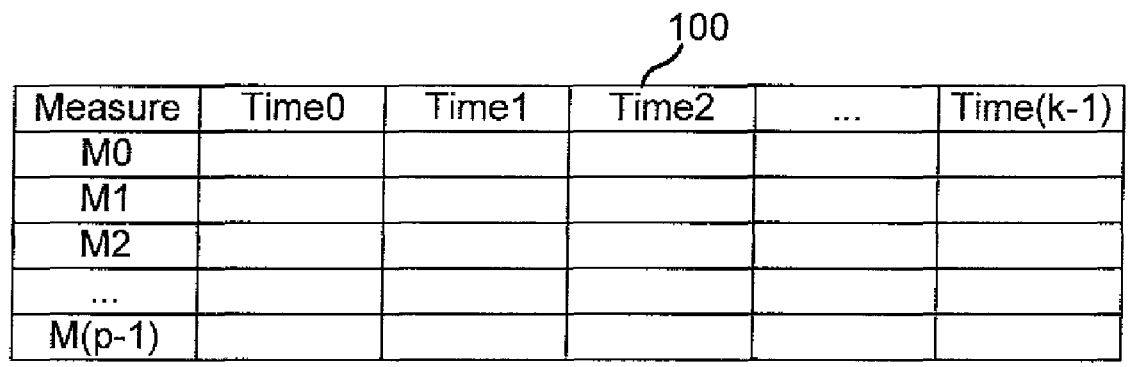
FIG. 1A depicts an example of a block of data according to one embodiment.

FIG. 1A depicts an example of a block of data 100 according to one embodiment. Block 100 includes multiple dimensions. The dimensions may be referred to as a measure dimension and a second dimension. The measure dimension is the dimension in which the array is created and is categorized by a dimension. For example, a measure (M) is categorized by a time dimension. The measure dimension may be a size of "P" measures and the time dimension may be of a size "K". This block of data is converted into an array the size of (K×P). The array may be an array of doubles. A double is in an integer decimal format (e.g., 1.1, 1.2, etc.). However, it will be understood that other formats may be used to store the values.

Figure 1B:
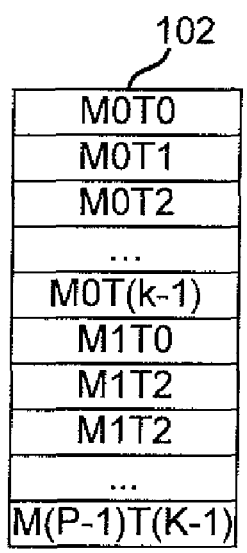
FIG. 1B shows a fully-exploded array for the block of data according to one embodiment.

FIG. 1B shows an example of an array if it were used to store the data of FIG. 1A according to one embodiment. When a combination of a measure and time is received, the database system can compute an index into the array to determine a value for the measure and time combination. For example, given a tuple (M(I), time(J)), the index into the array of doubles is I*K+J, where I is from 0 to P−1 and J is from 0 to K−1. The value of the index that is calculated is used to retrieve a value from the array shown in FIG. 1B.

FIG. 1B shows a fully-exploded array 102 for data block 100 according to one embodiment. The array may be fully-exploded in that it includes storage for a value for every possible combination of the dimensions. As discussed above, for every dense combination, a fully-exploded array may be created for the block of data conventionally. However, particular embodiments use a value-bit format to represent the fully-exploded array shown in FIG. 1B.

The value-bit format may be useful when a number of unique values in the block of data is below a certain number. For example, if every value in the block is different, then using the value-bit format might not be useful. An analysis is thus performed to determine if the value-bit format should be used. A number of unique values may be first determined. For example, a histogram analysis may be performed to map the number of unique values against the corresponding index of a cell. If there are many cells with the same value, then the space used to store the data values may be reduced using a value-bit format. As will be discussed below in more detail, a threshold may be used to determine if the block of data can be represented in a value-bit format.

As shown in FIG. 2A, a block of data 100 includes the following values: null, 2, and 3. FIG. 2B shows a histogram analysis of the number of the unique values. As shown, the value of null is found in the block of data six times, the value of 2 is found 5 times, and the value of 3 is found 3 times. In this case, it may be more efficient to store the data in a value-bit format as shown in FIG. 2C. For example, if a threshold is three or less, then the value-bit format can be used since the value occurrences exceed the threshold. Other embodiments may use different conditions to determine whether to use a value-bit format. For example, one condition can be if all value occurrences exceed a threshold number. A different condition can be if less than all occurrences exceed a threshold number. Other analysis can be performed on the block values and occurrences in order to determine whether to use the value-bit format.

In FIG. 2C, a value 202 is stored for the unique values. In this case, 2, 3, and null are the values. A bit set 204 is then stored for each unique value. The bit set uses a bit to indicate whether or not the unique value is stored at an index position for the array. For the bit set, a value of zero indicates the unique value is not found in that index position and a value of 1 indicates the unique value is found in the index position. For example, for the index of zero in the array, bit sets 204 may be used to determine which unique value is found in that position. If a user wants to retrieve the value for the first position of the array, for the value of 2 and 3, the bit value is zero, and thus these unique values are not found in the first position. However, the bit value for the first position is 1 for the null value and thus a null is found in the first position of the array. Although a bit set is described, it will be understood that other methods of indicating whether a value is found in a position of the array may be used.

Storing the block of data in the value-bit format instead of in an array may use less memory or disk space. Fifteen bits are used to indicate a yes or no indication for the array that includes 15 positions. Each position in a fully-exploded array of doubles may be 32 bits. Thus, the size of the array may be 32*15. However, a bit value may be 1 byte. Thus, the amount of storage needed for the above case is (32 bits*the number of unique values)+(15 bits*the number of unique values). In this case, the number of bits used for the value-bit format is significantly less because only 3 unique values are stored with three bit sets of 15 bits.

An additional amount of memory may be saved by performing an optimization to the format used in FIG. 2C. FIG. 2D shows an optimization of the value-bit format according to one embodiment. The largest bit set does not have to be stored by having a default value or fallout. For example, if there are 3 unique values in the block of data, if the bit values for the first two unique values indicate that they are not found in that position, then the last unique value has to be found in that position (i.e., it includes a bit value of 1). As shown, if the unique values of 2 and 3 return a zero for the first position, then the position has to include a null value.

FIG. 2D shows a default value 206 that has replaced the null value of FIG. 2C. Also, a value 208 of null is associated with the default value. Since the value of null is associated with a largest bit set, if a search for an index is performed and is not found in the unique values for 2 and 3, the fallout will be associated with the default value of null. In this case, the largest bit set does not need to be stored. This may improve memory used if memory required to store the unique value and bit set is more than memory used to store the default value and unique value.

Figure 2E:
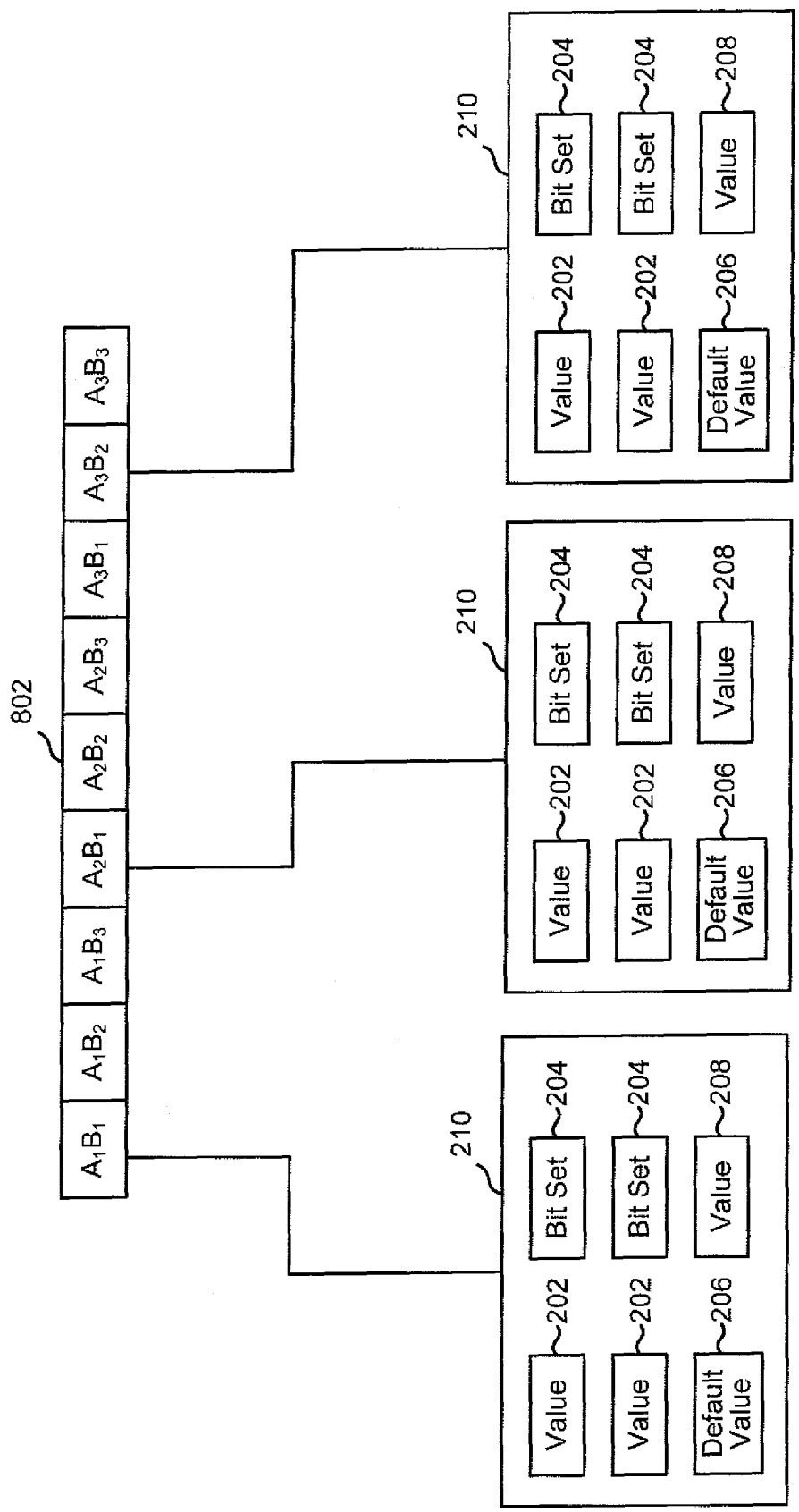
FIG. 2E shows an example of FIG. 8 where the value-bit format is used.

FIG. 2E shows an example of FIG. 8 where the value-bit format is used. As shown, the arrays have been replaced with data structures 210 that use the value-bit format to store data. As shown, data structures 210 have been created for three dense dimensions. The value-bit format has been used to store the block of data. However, a formula used to determine values from index positions in the array can still be used to return data values.

Although one level of sparse dimension indexes is shown, it will be understood that multiple levels of sparse dimension indexes may be used. For example, any arbitrary number of sparse combinations may be used to index into a block of data. Further, although the block of data is shown as two dimensions, it will be understood that the block of data may be any arbitrary number of dense dimensions. For example, a measure dimension is used to index into any number of other dimensions.

Using the above value-bit format may not always provide better compression as compared to a fully-exploded array. For example, if every single cell in an array includes a unique value, then it may not be better to store the block of data in the value-bit format. Accordingly, a threshold for a number of unique values may be used to determine if the value-bit format should be used.

Figure 3:
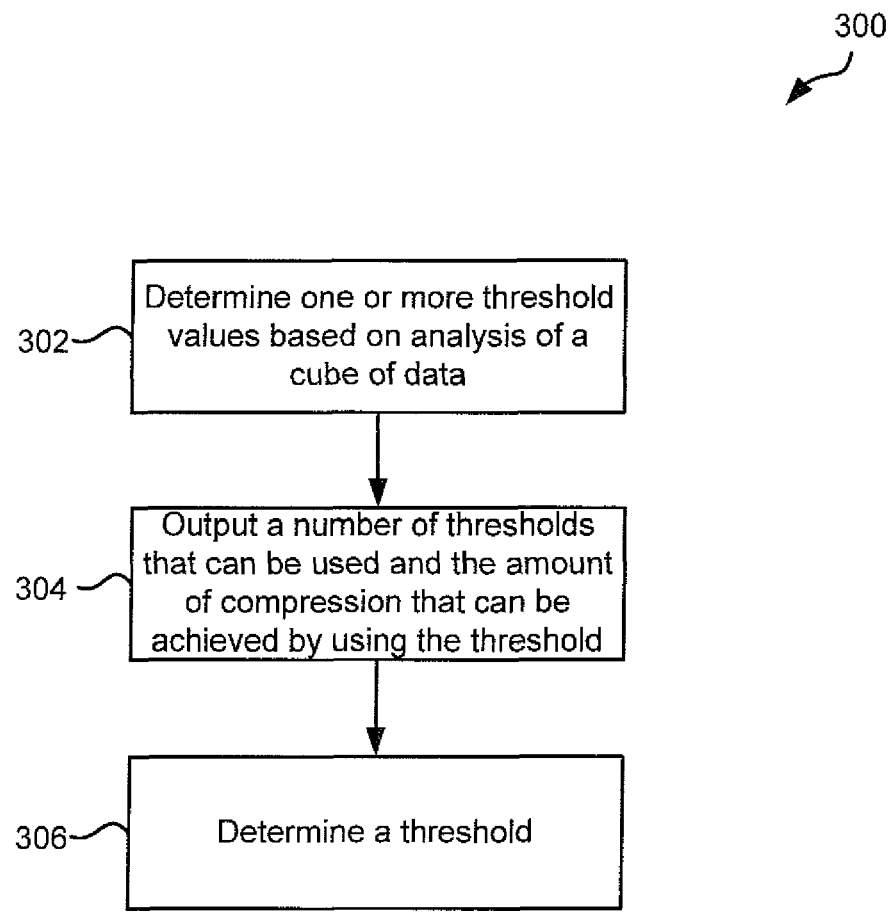
FIG. 3 depicts an example of a flowchart for setting a threshold according to one embodiment.

FIG. 3 depicts an example of a flowchart 300 for setting a threshold according to one embodiment. In step 302, the method determines one or more threshold values based on analysis of a cube of data. The threshold value may be determined automatically based on an analysis of the cube of data. For example, the cube of data may be analyzed and a corresponding number of blocks with a number of unique values are determined. A statistical distribution for the unique values for cells in all the blocks is determined and one or more threshold values are automatically determined based on the distribution. The threshold values may weigh how much compression can be achieved by storing the blocks of data in a value-bit format based on using different threshold values.

It should be noted that storing the block of data in the value-bit format may increase processing time to retrieve values. This is because a calculation needs to be performed to determine what value is found at the indices. For example, it is first determined whether the unique value of 2 is found at a position. If the unique value of 2 is not found, it is determined whether the unique value of 3 is found, etc. until the unique value is found. If a fully-exploded array is used to store the block of data, the index stores the value directly at the index position and the value is returned based on the index position. However, a trade off in memory space used may be more valuable than processing time and the extra processing time required may be neglible. Accordingly, the threshold determined may weigh the value of storage vs. the value of processing time.

A user may be provided an opportunity to choose a threshold. For example, step 304 may output a number of thresholds that can be used and the amount of compression that can be achieved by using each threshold. A higher threshold may achieve more compression. However, it may be found that using higher thresholds may achieve less and less compression. For example, a threshold of 5 may achieve 20% compression; a threshold of 10 may achieve 35% compression; and a threshold of 15 may achieve 40% compression. Accordingly, it may be better to choose a threshold of 10 rather than 15.

Step 306 determines a threshold. For example, a user may select the threshold that is desired. Also, the threshold may be automatically determined based on an analysis of the data for the cube. The threshold automatically determined may be the threshold that is determined to be the best threshold for maximizing compression.

Once the threshold is determined, the cube of data may be stored in a database. For each block of data for the cube, the threshold may be used to determine if a value-bit format or fully-exploded array may be used. Also, for a block, a hybrid approach may be used in which some measures are stored as fully-exploded arrays and some measures are stored in the value-bit format. The hybrid method may be performed when each measure is compared to the threshold instead of the whole block of data. That is, if a measure includes four unique values and the threshold is 5, then the measure may be stored in the value-bit format. However, if another measure includes 7 unique values, then this measure is stored in the fully-exploded array. This allows a block of data to take advantage of the value-bit format even though it may have more unique values than the threshold.

Figure 4:
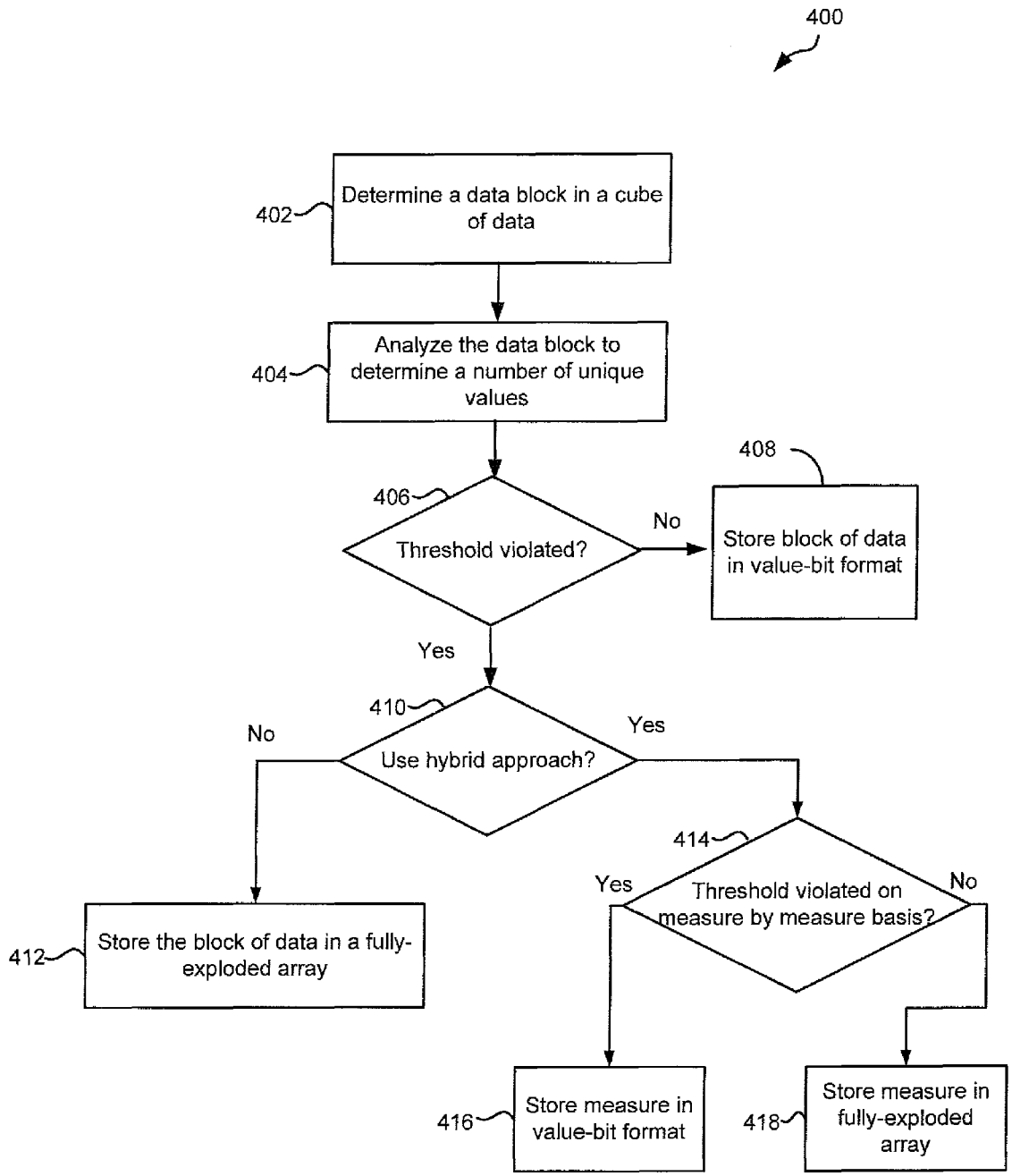
FIG. 4 depicts an example flowchart for storing a cube of data according to one embodiment.

FIG. 4 depicts an example flowchart 400 for storing a cube of data according to one embodiment. Step 402 determines a data block in a cube of data. This method may be performed for every block of data that is instantiated for dense dimensions. Step 404 then analyzes the data block to determine a number of unique values.

Step 406 determines if the number of unique values violates the threshold. It should be noted that different interpretations of the threshold may be provided. The threshold may be interpreted as if the number of unique values is less than or equal to the threshold. Also, the threshold may be interpreted as if the number of unique values is less than the threshold. The number of unique values may be the number before or after the optimization. For example, if 3 unique values are found, then this may include a data set where the value-bit format is used for 2 of the unique values and then a default value is stored. Also, the threshold can mean the number of unique values without using the default value. In all cases, it is determined if the threshold is violated or not by the number of unique values.

If the number of unique values does not violate the threshold, step 408 stores the block of data using the value-bit format. In this case, the unique values may be stored and associated with a bit set indicating where they occur in the array. Also, in an optimization, the value with the most occurrences is stored as a default value. Accordingly, with only one unique value, there is just one value stored as a default value and no bit sets. With X unique values, the data structure includes X−1 values with a bit set for each of the X−1 values and also one default value.

If the number of unique values is above the threshold, step 410 determines if a hybrid approach may be used. If the hybrid approach cannot be used, step 412 stores the block of data in a fully-exploded array. In this case, the storage of P*K for an array is used to store the block of data.

Figure 5:
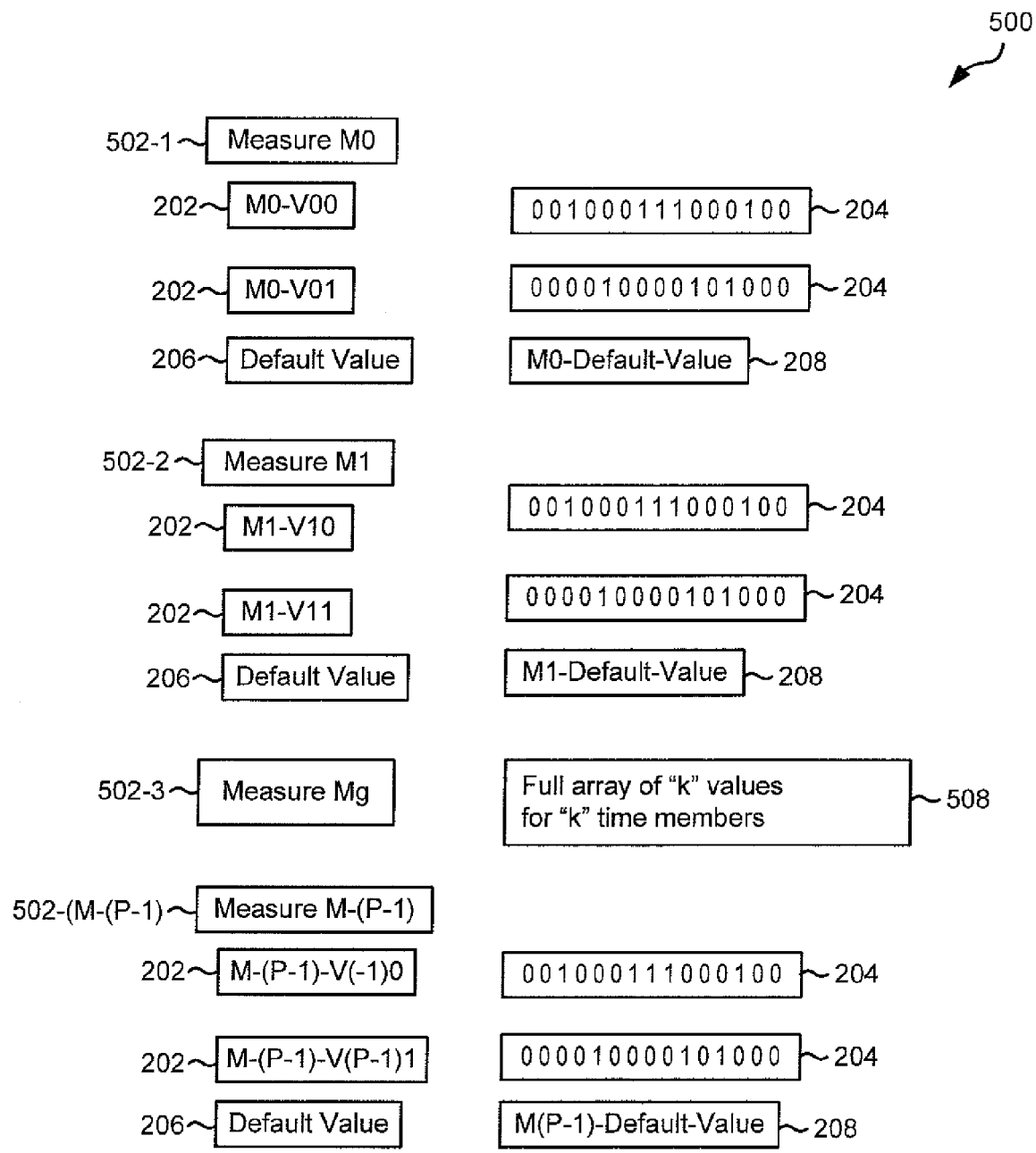
FIG. 5 depicts an example showing a data structure using the hybrid approach according to one embodiment.

If the hybrid approach should be used, then the threshold is applied on a measure-by-measure basis in step 414 to determine if the value-bit format can be used. FIG. 5 depicts an example showing a data structure 500 using the hybrid approach according to one embodiment. Data structure 500 includes a plurality of measures 502. Each measure may include a dense number combination for different dimensions. For the block of data, measures M0 502-1, M1 502-2, and M-(P-1) 502-M-(P-1) include 3 unique values. However, a measure Mg 502-3 may include more than 3 unique values (e.g., 4 unique values). If the threshold is 3 or less for the block of data and the hybrid approach is not used, then a fully-exploded array is used for the blocks of data in step 418 because the number of unique values in a block is above the threshold. However, the threshold is violated because only one measure has unique values that violate the threshold while the rest of the measures have a number of unique values that do not violate the threshold. Accordingly, the hybrid approach may apply the threshold on a measure-by-measure basis and apply the value-bit format to specific measures that meet the threshold in step 416.

As shown, the data structure 500 stores data for measures M0, M1, and M-(P-1) in the value-bit format. If referring to the data block found in FIG. 1A, the measure M0 is the data found in the first row of the data block, the data for M1 is found in the second row of the data block, and the data for M-(P-1) is shown in the last row of the data block. The measure Mg may be found in any of the other rows.

A value 204 is provided for each measure and bit storage 206 is provided for measures using the value-bit format. Also, a fully-exploded array 508 is provided for measure Mg. The optimization is applied to store default value 206 with the value 208. Accordingly, the fact that a block of data may include more unique values than the threshold may not preclude from using the value-bit format if at least some of the measures do not violate the threshold. This allows a compression to be achieved for a block of data even though the threshold is not met.

Storing the data using the measure-specific value-bit format allows for optimizations when changes in a block of data are performed. For example, multiple users may wish to change data found in a block of data. Conventionally, the fully-exploded array was copied to allow a user to change the data. When the changes are made, a new version of the fully-exploded array is stored. This doubles the storage space as the base block of data and the newly-changed block of data are stored in the database. Because particular embodiments store the data the measure-specific way, only changes to the base block of data may be stored instead of an entirely new base block of data.

Figure 6A:
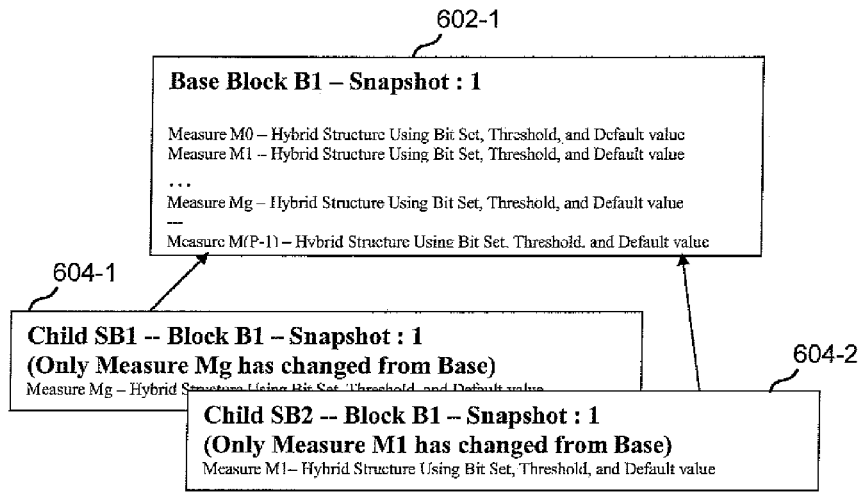
FIG. 6A shows an example of a data structure that is being altered according to one embodiment.

FIG. 6A shows an example of a data structure that is being altered according to one embodiment. A base block #1 602 represents a starting point for a block of data. This is the base block of data without any changes in it (or a block of data that has been reconciled and is valid). A child sandbox #1 604-1 and a child sandbox #2 604-2 are also created. A child sandbox is a copy of the base block of data that is being used by a user to perform a what-if analysis. A what-if analysis is when a user may change the data found in the base block of data. Child sandbox #1 and child sandbox #2 may be manipulated by different users.

When a change to a measure is stored for child sandbox #1, only the changes for that measure are stored. That is, the entire base block of data is not re-stored. The child sandboxes reference the base block with the changes and only store the changes. Also, for child sandbox #2, any changes to a measure may be stored. By only storing the changes, compression is achieved. For example, in child sandbox #1, only a measure Mg has been changed. In this case, the bit set for the measure Mg is changed and a reference from the sandbox to base block B1 is generated to denote the changes. Also, for child sandbox #2, the measure M1 has been changed and the bit set for this measure is referenced back to base block B1. When values are read from the data block, if the measure has not changed, the values are read from base block B1. However, if a value is requested for a measure has been changed, it is read from child sandbox #1 or child sandbox #2.

One reason the changes can be stored for the base block of data is because the data is stored measure-by-measure in the value-bit format. If a fully-exploded array is used for each block of data, it is not possible to efficiently store the changes because the change that is received for a cell in the block cannot be easily referenced using the formula to determine the value in the fully-exploded array. For example, it is hard to determine where in the fully-exploded array a change to a measure is represented. This is because a formula is used to store the data in a fully-exploded array, and the measures in the fully-exploded array are not referred to. Rather, an index value is used to index into the array. However, when particular embodiments use a measure-by-measure method for storing data in a value-bit format, the changes to the measures can be easily stored by changing bit values and referring to the measure being stored in the base block.

Figure 6B:
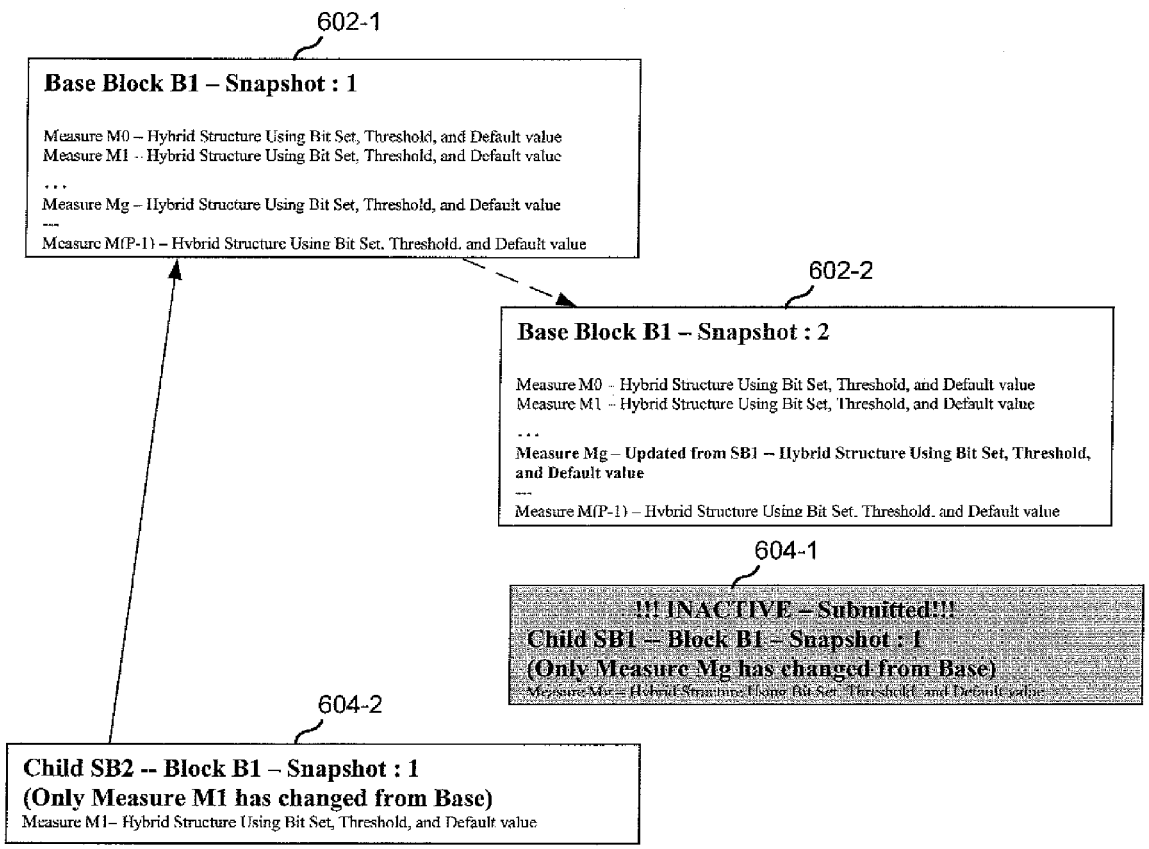
FIG. 6B shows an example of reconciling snapshots according to one embodiment.

Because only changes are being stored for child sandboxes, reconciling the changes may be performed to form a new snapshot of a base block that includes the changes. FIG. 6B shows an example of reconciling snapshots according to one embodiment. For example, with many different sandboxes referencing the base block with changes, a new snapshot may be made where the changes are applied to the new snapshot to form a new base block. For the example shown in FIG. 6A, when child sandbox #1 is applied to the base block, a snapshot-2 602-2 may be created. In snapshot-2, the changes to the measure Mg may be reflected.

Child sandbox #2 has not been submitted yet and is still pointing to snapshot-1. However, when child sandbox #2 is submitted to snapshot-1, those changes need to be reflected in snapshot-2. A reconcile may be performed to reconcile the changes to the old snapshot-1 to the new snapshot-2. In this case, the changes to M1 for snapshot-1 are applied to snapshot-2 from child sandbox #2. The reconcile works if sandboxes have not changed the same values in a measure. However, if child sandbox #1 and child sandbox #2 have changed the same measure (in this case, they have not as child sandbox #1 changed measure Mg and child sandbox #2 changed measure M1), then a reconcile error may be output. In this case, a user may be asked to reconcile the differences. If no errors exist, then all changes are reconciled into snapshot-2. Any new child sandboxes are then created from snapshot-2. The child sandboxes may then become inactive in memory as they have been submitted.

Figure 7:
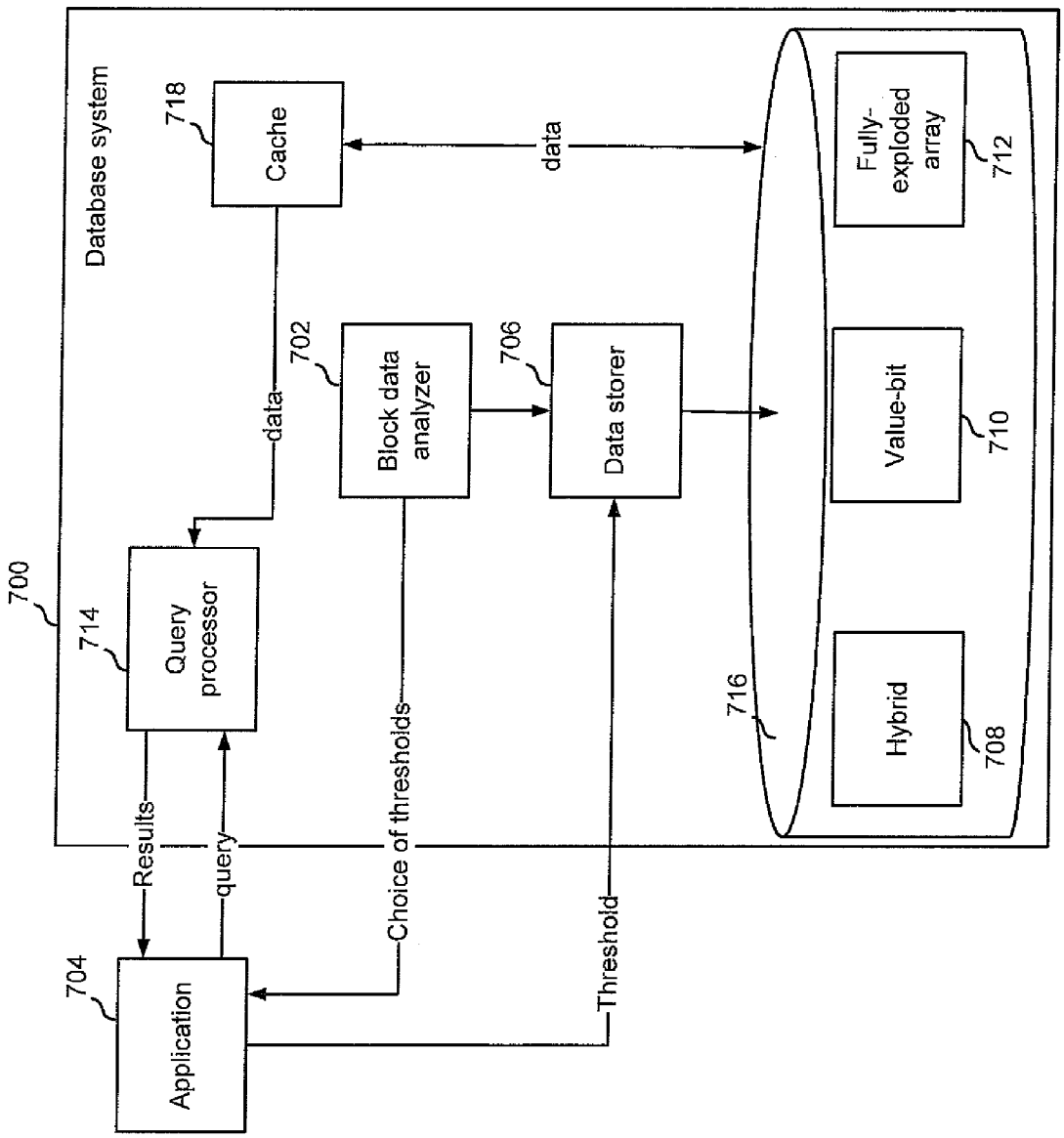
FIG. 7 discloses an example of a database system according to one embodiment.

FIG. 7 discloses an example of a database system 700 according to one embodiment. Database system 700 includes a block data analyzer 702 that is configured to determine a number of unique values for blocks of data. Block data analyzer 702 determines different thresholds and may output them to an application 704. Application 704 may display the thresholds to a user. A user may then select a desired threshold.

A data storer 706 receives the unique values and the location of the unique values in different data blocks. Also, a threshold may be received. Depending on the threshold and the number of unique values in each data block, data storer 706 may store the data in different ways. As shown, the data may be shown in a hybrid format 708, a value-bit format 710 or a fully-exploded array format 712.

Application 704 may then be used to query for data in the cube of data. For example, different analytical queries from an OLAP application may be received at query processor 714. Query processor 714 may retrieve data stored in the different formats. For example, the data for the different formats may be stored in a database 716. When an application is manipulating the data, it may be moved to cache 718. When the block of data is transferred from database 716 to cache 718, the network traffic used may be less because the value-bit format used may use include less data and thus uses less bandwidth to transfer it to cache 718. Query processor 714 then applies the queries to the data stored in cache 718 and can output a result to application 704.

If changes to the data occur, then the changes can be stored back to database 716. As discussed above, only changes to the measures may be stored. In this case, only the changes need to be sent from cache 718 to database 716. This alleviates traffic on the network as only the changes are sent rather than the entire block of data.

Particular embodiments provide compression that significantly improves the amount of memory needed to store a cube of data. The compression also allows a data system to keep more numbers of blocks in cache and reduces the network traffic between the disk and the application because not as much data needs to be transferred between the disk and application. This results in less disk space used. Also, when data is transferred to memory, less bandwidth is used because less data is transferred and also less memory is used to store the data.

Although the description has been described with respect to particular embodiments thereof, these particular embodiments are merely illustrative, and not restrictive. Although OLAP is described, it will be understood that other applications may be used to query data stored in the form described.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for storing multi-dimensional block data for a cube of data, the cube of data including a plurality of blocks of data for different combinations for dimensions of the cube of data, the method comprising:
   determining a block of data for the cube of data, the block of data including multi-dimensional data for a plurality of dimensions;
   determining one or more unique values in the block of data;
   determining index positions for one or more unique values based on an occurrence of a unique value at an index position for an array based on the plurality of dimensions for the block of data; and
   storing, in a data structure, the block of data as one or more unique values with indications of where the unique values would be stored in index positions in the array.

2. The method of claim 1, further comprising:
   determining a unique value with a highest occurrence; and
   associating a default value with the unique value instead of storing indications of the occurrences for the unique value.

3. The method of claim 1, further comprising:
   analyzing the block of data to determine a number of occurrences for the unique values;
   determining a threshold value of a number of unique values; and
   outputting a measure of compression that can be obtained by storing the values for the unique values associated with the indication of occurrences versus storing the array for the plurality of dimensions.

4. The method of claim 1, further comprising:
   storing the data structure as the array if a number of unique values is above a threshold.

5. The method of claim 4, further comprising using a hybrid approach by storing a first portion of the data using the array if a number of unique values violates a threshold for a dimension of the block of data and a second portion of the data in a value-bit format if a number of unique values does not violate the threshold for the dimension of the block of data.

6. The method of claim 1, further comprising:
   receiving a change for data associated with a measure dimension of the plurality of dimensions in the block of data; and
   storing the change in the data structure for the measure dimension instead of storing a copy of the block of data with the change.

7. The method of claim 1, wherein the block of data is stored in a value-bit format, the value-bit format storing a bit pattern indicating whether unique values are found in index positions of the array.

8. The method of claim 1, wherein the cube of data includes sparse dimensions and dense dimensions, wherein one or more combinations of sparse dimensions are used as an index to the block of data.

9. The method of claim 8, wherein the plurality of dimensions for the block of data includes a combination of dense dimensions in which the one or more combinations of sparse dimensions are used to index to the block of data.

10. The method of claim 8, wherein the plurality of dimensions include a measure dimension and one or more dense dimensions, wherein the data structure represents data for the one or more dense dimensions using the measure dimension as an index for the array.

11. The method of claim 1, further comprising:
receiving a query for data in the cube of data;
determining an index position in the array for the query;
determining a value in the data structure that corresponds to the index position; and
returning the value.

12. The method of claim 1, wherein storing the data structure uses less memory or disk space than if the data structure was stored as the array.

13. A computer-readable storage medium comprising encoded logic for execution by the one or more processors and when executed operable to store multi-dimensional block data for a cube of data, the cube of data including a plurality of blocks of data for different combinations of dimensions of the cube of data, the logic operable to:
determine a block of data for the cube of data, the block of data including multi-dimensional data for a plurality of dimensions;
determine one or more unique values in the block of data;
determine index positions for one or more unique values based on an occurrence of a unique value at an index position for an array based on the plurality of dimensions for the block of data; and
store, in a data structure, the block of data as one or more unique values with indications of where the unique values would be stored in index positions in the array.

14. The computer-readable storage medium of claim 10, wherein the logic when executed is further operable to:
determine a unique value with a highest occurrence; and
associate a default value with the unique value instead of storing indications of the occurrences for the unique value.

15. The computer-readable storage medium of claim 10, wherein the logic when executed is further operable to:
analyze the block of data to determine a number of occurrences for the unique values;
determine a threshold value of a number of unique values; and
output a measure of compression that can be obtained by storing the values for the unique values associated with the indication of occurrences versus storing the array for the plurality of measures and the dimension.

16. The computer-readable storage medium of claim 10, wherein the logic when executed is further operable to store the data structure as the array if a number of unique values is above a threshold.

17. The computer-readable storage medium of claim 13, wherein the logic when executed is further operable to use a hybrid approach by storing a first portion of the data using the array if a number of unique values violates a threshold for a dimension of the block of data and a second portion of the data in a value-bit format if a number of unique values does not violate the threshold for the dimension of the block of data.

18. The computer-readable storage medium of claim 10, wherein the logic when executed is further operable to:
receive a change for data associated with a measure dimension of the plurality of dimensions in the block of data; and
store the change in the data structure for the measure dimension instead of storing a copy of the block of data with the change.

19. The computer-readable storage medium of claim 10, wherein the block of data is stored in a value-bit format, the value-bit format storing a bit pattern indicating whether unique values are found in index positions of the array.

20. An apparatus configured to store multi-dimensional block data for a cube of data, the cube of data including a plurality of blocks of data for different combination pairs for dimensions of the cube of data, the apparatus comprising:
one or more processors; and
logic encoded in one or more tangible media for execution by the one or more processors and when executed operable to:
determine a block of data for the cube of data, the block of data including multi-dimensional data indexed by a first dimension and a second dimension;
determine one or more unique values in the block of data;
determine index positions for one or more unique values based on an occurrence of a unique value at an index position for an array; and
store, in a data structure, the block of data as one or more unique values with indications of where the unique values would be stored in index positions in the array.

* * * * *

UNITED STATES PATENT AND TRADEMARK OFFICE
CERTIFICATE OF CORRECTION

| | | |
|---|---|---|
| PATENT NO. | : 8,024,288 B2 | Page 1 of 1 |
| APPLICATION NO. | : 12/199759 | |
| DATED | : September 20, 2011 | |
| INVENTOR(S) | : Ramaiyer | |

It is certified that error appears in the above-identified patent and that said Letters Patent is hereby corrected as shown below:

In column 5, line 62, delete "neglible." and insert -- negligible. --, therefor.

Signed and Sealed this
Sixth Day of December, 2011

David J. Kappos
*Director of the United States Patent and Trademark Office*